Feb. 15, 1966     R. A. ANDREWS ETAL     3,235,087
APPARATUS FOR SEPARATION OF LIQUIDS FROM SOLIDS
Filed Oct. 8, 1962     2 Sheets-Sheet 1
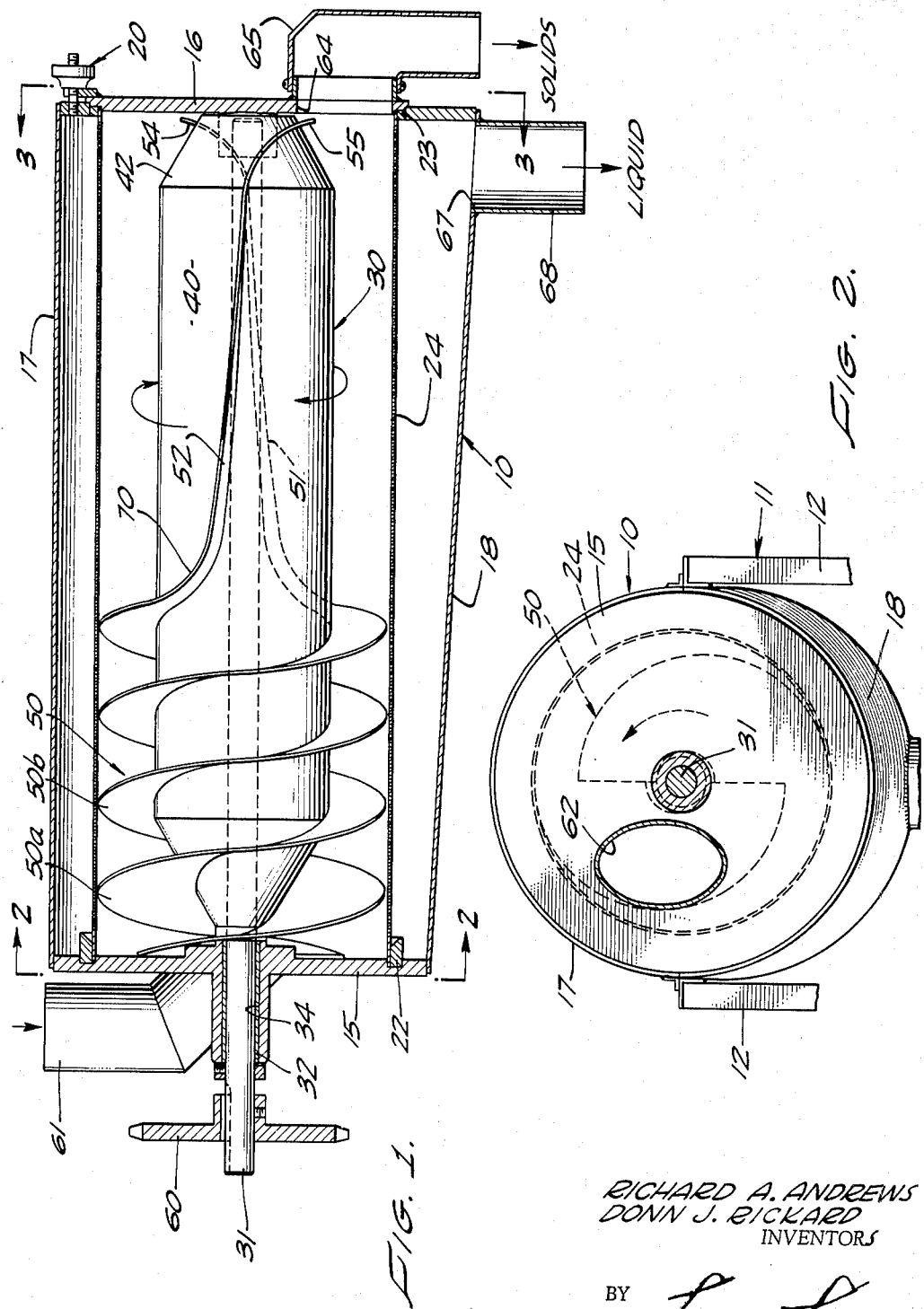
RICHARD A. ANDREWS
DONN J. RICKARD
INVENTORS
BY *Lyon+Lyon*
ATTORNEYS Feb. 15, 1966 R. A. ANDREWS ETAL 3,235,087
APPARATUS FOR SEPARATION OF LIQUIDS FROM SOLIDS
Filed Oct. 8, 1962 2 Sheets-Sheet 2
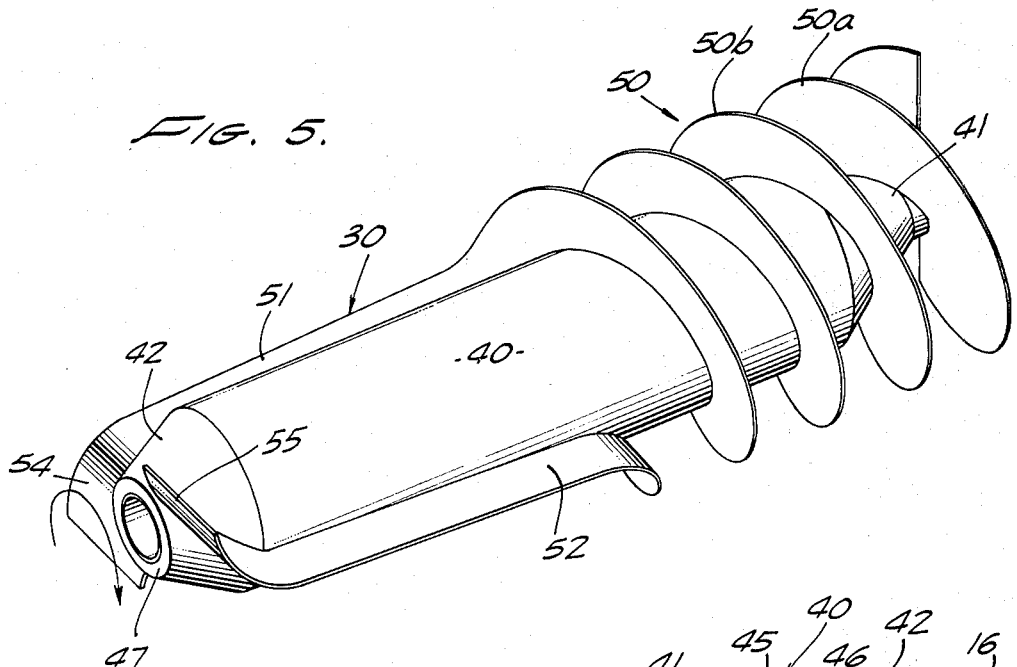
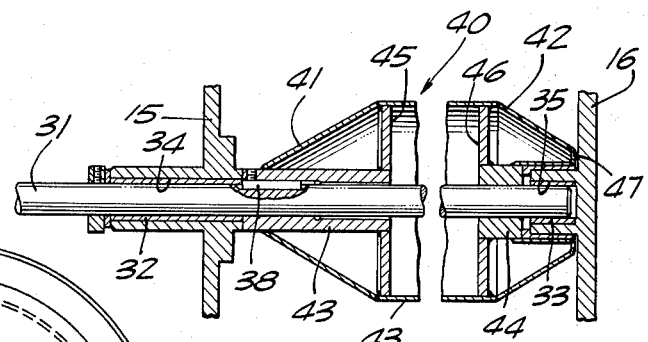
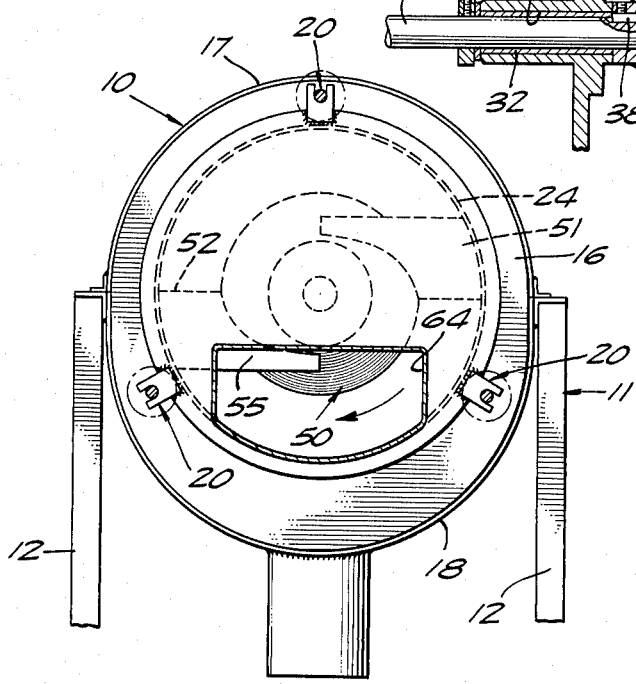
RICHARD A. ANDREWS
DONN J. RICKARD
INVENTORS
BY Lyon+Lyon
ATTORNEYS United States Patent Office 3,235,087
Patented Feb. 15, 1966

3,235,087
APPARATUS FOR SEPARATION OF LIQUIDS FROM SOLIDS
Richard A. Andrews, Whittier, and Donn J. Rickard, Glendora, Calif., assignors to Brown Citrus Machinery Corporation, Whittier, Calif., a corporation of California
Filed Oct. 8, 1962, Ser. No. 228,827
3 Claims. (Cl. 210—415)

This invention relates to the separation of liquids from solids containing the same, and has particular reference to an improved finisher especially useful in the processing of solids-liquid admixtures of high solids content.

A primary object of the present invention is to provide a novel apparatus for continuously and efficiently separating liquids from solids.

Paddle finishers are conventionally used in the finishing of citrus juice and the like, wherein it is desired to remove some portion of the solids from the raw juice as it comes from the juice extracting machines. This juice has a relatively low solids content, of the order of 20%, and is handled quite adequately by the conventional paddle finishers, which comprise two or more paddles, of generally helical configuration but of low pitch, mounted to rotate within a cylindrical screen and to force the liquid outwardly through the screen by centrifugal action. Such finishers are, however, not satisfactory for the handling of admixtures of relatively high solids content, particularly those wherein the solids are in the form of relatively thin particles such as the shaved flavedo from citrus oil recovery apparatus of the type disclosed in the copending James application Serial No. 12,121, filed March 1, 1960, now Patent No. 3,070,140, and the thin, chip-like particles such as are obtained from the apparatus disclosed in the copending application of Andrews et al. Serial No. 57,002, filed September 19, 1960, now abandoned. In attempting to finish solid-liquid admixtures of this type in a paddle finisher, the inside of the screen rapidly becomes plugged, apparently due to the lack of sufficient axial forces for conveying the solids along the screen from inlet to outlet.

Screw-type finishers, wherein the conveying means comprises a screw or auger of relatively high pitch, are also commonly used to separate liquids from solids and such devices do provide increased axial forces for conveying large amounts of solids through the finisher. It has been found however, that such screw finishers do not provide adequate drying action for finishing admixtures of the type referred to above, wherein it is extremely important to remove essentially all of the liquid or liquor from the solids.

A further object of the present invention is, therefore, to provide a novel finisher combining the attributes of the paddle and screw-type finishers, but eliminating the disadvantages thereof as applied to the finishing of admixtures of high solids content.

Another object of the present invention is to provide a novel finisher apparatus which is extremely simple and rugged in construction and adapted to be manufactured economically.

Other objects and advantages of the present invention it is believed will be readily apparent from the following detailed description of a preferred embodiment thereof when read in connection with the accompanying drawings.

In the drawings:

FIGURE 1 is a side elevation, partly in vertical section, illustrating a preferred form of apparatus embodying the present invention.

FIGURE 2 is a sectional view taken substantially on the line 2—2 of FIGURE 1.

FIGURE 3 is a sectional view taken substantially on the line 3—3 of FIGURE 1.

FIGURE 4 is a detailed fragmentary vertical section illustrating the shaft mountings.

FIGURE 5 is a perspective view of the impeller portion of the apparatus.

Referring now to the drawings, the finisher of the present invention includes a housing, generally indicated 10, mounted upon a suitable frame, generally indicated 11, provided with leg members 12.

The housing is formed by front and rear end walls 15 and 16 of generally circular configuration, a semi-cylindrical top wall 17 and a curved bottom wall 18, the lowermost portion of which slopes gradually from front to rear as shown in FIGURE 1, to provide collection and drainage means for the separated liquid. Means are provided for quick disassembly of the housing components and as shown in the drawings, these means may include the clamp assemblies 20 for releasably connecting the top and bottom walls 17 and 18 to the rear end wall 16.

Mounted within the housing, as by means of conventional mounting rings 22 and 23, is a cylindrical screen 24, the screen extending between the end walls 15 and 16.

An impeller member, generally indicated 30 is mounted for rotation in the housing and within the confines of the screen, the impeller member including a shaft 31 journalled in suitable bearings 32 and 33 positioned respectively in the bores 34 and 35 of end walls 15 and 16. Secured to the shaft 31 for rotation therewith, as by means of a key 38, is a cylinder member 40 having tapered end portions 41 and 42. Preferably, the member 40 is hollow, the preferred specific details of the construction thereof being shown in FIGURE 4 and including mounting sleeves 43 and 44, interior radial wall portions 45 and 46, and an end wall portion 47.

Carried on the cylinder member 40 and forming a part of the impeller 30 is a screw member 50, preferably of the double lead type and preferably positioned on the portion of the cylinder member adjacent the forward or feed end of the finisher. As shown, the flights 50a and 50b of the screw member extend only partially along the cylinder member 40 and merge into paddle elements 51 and 52 which extend generally longitudinally of the cylinder member, preferably at a helix angle of low pitch. Preferably, the ends of the paddle elements are curved as at 54 and 55, these curved end portions being free from contact with the tapered portion 42 of the cylinder member.

Means are provided for rotating the impeller member 30 in the direction of the arrow in FIGURE 1 and at a relatively high speed. As shown in the drawings, these means may include a gear 60 keyed to the shaft 31 for engagement with a driving gear (not shown) of a motor or the like.

Inlet and outlet means are provided and as shown in the drawings, the inlet means may include a conduit 61 leading into the interior of the housing through an opening 62 in the end wall 15. The solid outlet is through an opening 64 provided in the bottom of the rear end wall 16, away from which opening leads an outlet conduit 65. The liquid is discharged through an opening 67 in the bottom of the wall 18, a conduit 68 leading from this opening.

In operation of the apparatus thus described, the solids-liquid admixture is continuously fed into the housing through the conduit 61 while the impeller member is being rotated at a relatively high rate of speed, preferably of the order of 800 r.p.m. The peripheral edges of the screw flights and paddles form a cylindrical surface of revolution closely spaced from the interior surface of the screen 24, and it will thus be understood that as the admixture is fed into the housing, it is forceably conveyed away from the inlet opening 62 by means of the action of the screw member, inasmuch as the major component of force thus exerted is in the axial direction. Some degree of radial force is exerted by the screw flight upon the admixture, but only enough to remove the free-draining liquid through the screen. In the transition area between the screw flights and the paddles, indicated in the drawings by the reference numeral 70, the axial and radial components of force become more nearly equal and in this area a greater quantity of liquid is forced through the screen. Maximum radial and centrifugal force is obtained in the area defined by the paddles and it is here where the maximum removal of liquid or drying of the solids is obtained. The curved end portions 54 and 55 function as portions of a screw to facilitate discharge of the solids through the opening 64, and of course the liquids drain by gravity through the opening 67 and conduit 68.

From the above description it will be apparent that the apparatus of the present invention is especially suited for the separation of liquids from admixtures of high solids content. The screw member 50 provides the necessary axial conveying force and the paddles provide the necessary radial pressure for maximum liquid removal. It has been found that the enlarged cylindrical member 40 is an important feature of the apparatus in that it appears to prevent the build-up of material in the area adjacent the shaft which is experienced when attempts are made to utilize a paddle finisher for separation of liquids from high-solids admixtures. It has been found that superior results are obtained if the diameter of the cylindrical member is at least one-half the diameter of the screen.

The apparatus of the present invention is adapted to be used in the separation of liquids from all types of admixtures even though it is especially useful in connection with the high-solids type of admixture referred to above. It is to be further understood that impeller configurations other than that specifically shown and described herein may be utilized if desired. Thus, for example, for handling certain materials it may be desirable to obtain an increased longitudinal conveying action toward the outlet end of the finisher, and in such case, the paddle can be positioned adjacent the inlet end, with the screw member positioned adjacent the outlet end.

Having fully described our invention, it is to be understood that we do not wish to be limited to the details set forth but our invention is of the full scope of the appended claims.

We claim:
1. Apparatus for separating liquids from mixtures of liquids and solids, comprising the combination of a housing having end walls; inlet means in one of said end walls and outlet means in the other of said end walls; a cylindrical screen mounted within said housing and extending between said end walls; an impeller member mounted for rotation about an axis in said housing and within the confines of said screen, said impeller member including a cylinder member extending between said end walls, said cylinder member having a diameter at least one-half the diameter of said screen, a screw carried on said cylinder member and having a plurality of flights, said flights extending from a point short of said inlet means to an intermediate point between said end walls, said impeller member further including a paddle extending from said intermediate point to a point adjacent said outlet means, said paddle being of helical configuration but extending generally longitudinally with respect to said axis, the last of said flights changing pitch and merging into said paddle, said screw and said paddle defining cylindrical surfaces of revolution closely spaced from the inside surface of said screen; and means for rotation of said impeller member in a direction to cause solids to be conveyed from said inlet means to said outlet means.

2. The apparatus of claim 1, wherein said cylinder has tapered ends adjacent each of said end walls, wherein said screw comprises a double lead screw and wherein a pair of paddles are provided, one on each side of said cylinder.

3. The apparatus of claim 2, wherein the ends of the paddles nearest said outlet are outwardly curved.

References Cited by the Examiner
UNITED STATES PATENTS

| | | | |
|---|---|---|---|
| 775,320 | 11/1904 | Van Kirk | 233—7 |
| 2,558,799 | 7/1951 | Thomas | 146—76 |
| 2,582,244 | 1/1952 | Faith-Ell | 146—174 X |

FOREIGN PATENTS

| | | |
|---|---|---|
| 499 | 12/1889 | Great Britain. |
| 546,527 | 7/1956 | Italy. |

REUBEN FRIEDMAN, *Primary Examiner.*

RONALD R. WEAVER, *Examiner.*